Feb. 3, 1970   W. H. FOGARTY ET AL   3,493,175

CONDITION RESPONSIVE CONTROLLER

Filed March 4, 1968   2 Sheets-Sheet 1

INVENTORS
William H. Fogarty
Gordon N. Baustian
Harold E. Gold
by *Edward M. Stanton*
ATTORNEY United States Patent Office 3,493,175
Patented Feb. 3, 1970

3,493,175
CONDITION RESPONSIVE CONTROLLER
William H. Fogarty, Anchorage, Ky., and Gordon N. Baustian, Sioux City, and Harold E. Gold, Bettendorf, Iowa, assignors to American Air Filter Company, Inc., Louisville, Ky., a corporation of Delaware
Filed Mar. 4, 1968, Ser. No. 710,055
Int. Cl. F24d *1/00;* H01h *37/36*
U.S. Cl. 237—9  4 Claims

ABSTRACT OF THE DISCLOSURE

A controller sensitive to change in selected conditions in a fluid to operate means to maintain the fluid in a selected state. The controller includes a lever arm pivotably connected to a first element, which moves in response to a change in a first condition in the fluid, and to a second element, which moves in response to a change in a second condition in the fluid and carries a switch responsive to the angular position of the arm to operate selected control means to modify at least one of the conditions to maintain a selected relationship between the first and second conditions so the fluid is retained in a desired state.

BACKGROUND OF THE INVENTION

In certain applications it is desirable to maintain a fluid in a selected thermodynamic state. For example, in steam heating systems where steam is supplied to provide heat so that the steam is condensed and the condensate is returned to a boiler for revaporization, it is desirable to collect the condensate and return it to the boiler in the liquid state. It is, therefore, important to regulate the temperature and pressure relationship in the collection zone to prevent revaporation before the condensate is returned to the boiler. Previous switch arrangements to accomplish such purposes have been extremely complex and very expensive.

Some previous switch means for such applications have included a float chamber through which the fluid flows and where the state of the fluid is physically sensed. Since such devices are directly dependent on the actual state of the fluid and not on the thermodynamic conditions, for example temperature and pressure, of the fluid adjustments are not made in the conditions until the fluid has passed to the undesirable state, i.e., from liquid to vapor, and the change of state has been sensed by the float device. Moreover, such float chamber devices require multiple switches as well as various pressure and temperature measuring elements with complicated linking mechanisms.

Some other control arrangements for use in fluid flow systems respond to changes in thermodynamic conditions of the fluid without physically determining the state of the fluid and have included separate and independently operated temperature and pressure measuring devices which control the conditions within very close limits. The range of operation of such controllers and the application of such controllers is very limited.

Certain other fluid state controllers have provided means responsive to cumulative change in two conditions, for example a closed pressurized bulb filled with a selected fluid and immersed in the fluid so that the bulb expands or contracts in response to a change in fluid temperature or pressure, or both, where the expansion or contraction of the element provides the means to operate the controller. The control range of such devices cannot be varied without replacing the filled bulb. Furthermore, such arrangements generally do not provide the sensitivity of control necessary for satisfactory operation and, since the sensing elements are directly exposed to the fluid, limitations are placed on the construction of the bulb and its application because of the corrosive effects of the fluid.

It is recognized that the present invention provides a straightforward, inexpensive controller to maintain a fluid in a selected state which is extremely sensitive to changes in thermodynamic conditions of the fluid and selectively interrelates change in one condition, for example, pressure, without restrictive limitations on either condition.

Furthermore, it has been recognized that the controller provided by the present invention is extremely sensitive to changes in thermodynamic conditions of a fluid and is highly reliable because the operating elements are not immersed in the fluid.

Various other features of the present invention will become obvious to those skilled in the art upon reading the disclosure set forth hereinafter.

More particularly, the present invention provides a controller to maintain a desired relationship between first and second conditions in a fluid comprising: first condition responsive actuator means to move a first drive means in response to a change in the first condition of the fluid; second condition responsive actuator means to move a second drive means on response to a change in the second condition at the selected zone; lever arm means pivotably connected to the first and second drive means; switch means carried by the lever arm means and operable in response to the angular disposition of the lever arm; and, means operable by the switch means to selectively modify the relationship between the first and second conditions to maintain the fluid in a selected thermodynamic state.

It is to be understood that various changes can be made in the arrangement, form, or configuration of the apparatus disclosed hereinafter without departing from the scope or spirit of the present invention.

Referring to the figures.

Figure 2:
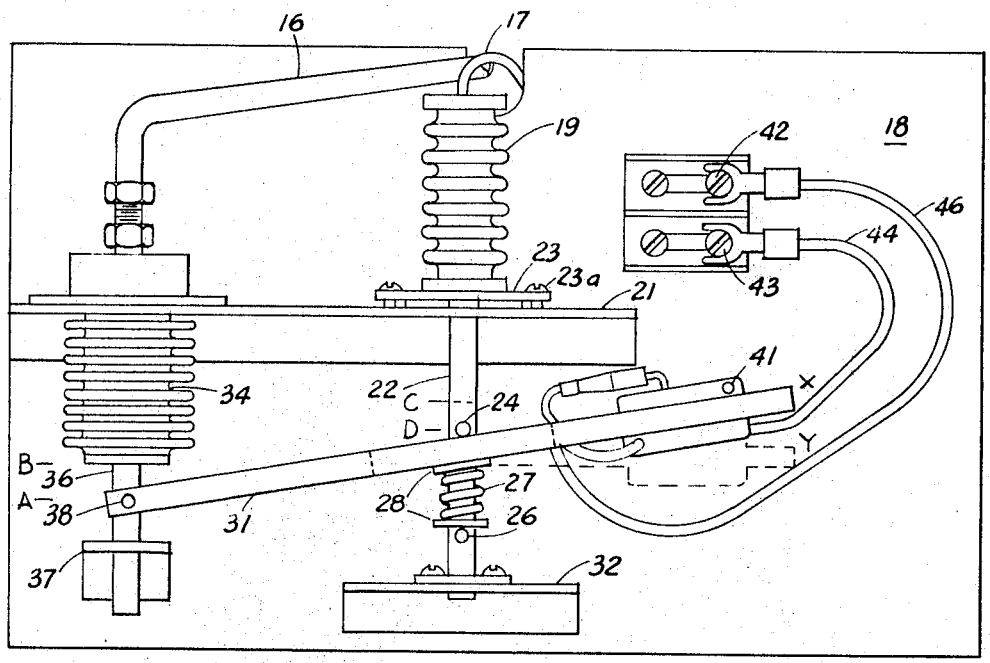
FIGURE 2 is a schematic view of a controller in accordance with the present invention; and, FIGURE 3 is a graphic illustration of the operation of one example of the controller as shown in the example of the figures.

Controller arrangements in accordance with the present invention can be used in various applications to effect a complementary change of one condition in a fluid in response to a change in a second condition in the fluid to maintain the fluid in a selected thermodynamic state. In the following example, as shown in the figures, a controller in accordance with the present invention is provided in a steam heating system which suplies steam to various locations within a building and includes a boiler 1 to provide steam for a steam supply header 2 which provides steam to conduits 3 for selected heat exchange means for example radiators, shown diagrammatically as radiators 15 in FIGURE 1 located throughout the building. Steam is condensed in the radiators and returned to a condensate header 4 through conduits 6 connected to the radiators. The returned condensate is collected in a receiver 7 to be recirculated in boiler 1 for revaporization.

Receiver 7, advantageously, operates at a low pressure, for example subatmospheric, to facilitate flow of steam and condensate through the heating system. A vacuum pump 8, driven by motor 9 is operated by a controller 14 in accordance with the present invention as hereinafter described where controller 14 communicates with receiver 7 to maintain a selected pressure-temperature relationship in the receiver. A pump 12 is connected to receiver 7, as shown, to return condensate to boiler 1 through condensate supply conduit 13.

It is important that revaporization of condensate in receiver 7 be minimized, otherwise condensate could not be returned to boiler 1 and the vaporized condensate would be lost through vacuum pump 9. To prevent such undesirable revaporization controller 14, in accordance with the example of the present invention, is provided to control the temperature and pressure relationship in receiver 7, and maintain the condensate in a liquid state while providing the lowest acceptable pressure in receiver 7. For optimum operation of the heating system it is desirable that the pressure-temperature relationship in receiver 7 closely approximate, and be slightly on the liquid side of, the saturation curve as shown graphically in FIGURE 3 where line 5 represents the saturation point of liquid and line 10 represents the desired temperature-pressure relationship to be maintained in receiver 7.

The elements of controller 14, as hereinafter described, are advantageously selected to maintain the desired relationship in receiver 7. Controller 14 is connected to receiver 7 by a pressure transmitting conduit 16 and a temperature transmitting conduit 17 including a temperature sensing element (not shown) located in condensate return 4 to transmit the temperature of the stream of condensate returned to receiver 7.

FIGURE 2 is an enlarged schematic view of one example of a controller in accordance with the present invention, and, as shown, the elements of the controller can conveniently be mounted on a back plate 18.

Figure 1:
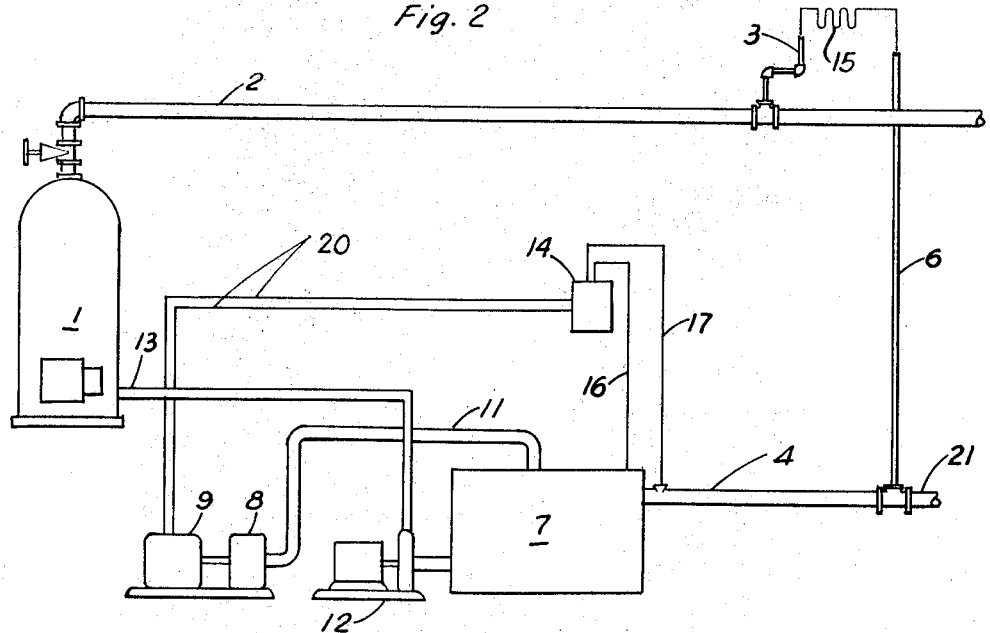
FIGURE 1 is a schematic view of a steam heating system showing one application of a controller in accordance with the present invention.

The controller as shown in FIGURE 2 includes a pressure actuated element, for example bellows 34, which communicates with pressure transmitting conduit 16 so the bellows expands and contracts in response to change in pressure in receiver 7. Bellows 34 expands and contracts selectively in response to incremental changes in pressure in receiver 7 and other bellows of different configuration can be selected in accordance with the application of the controller. Bellows 34 is mounted, as shown, on a bracket 21 which is fastened to plate 18, for example by spot welding. Bellows 34 carries an arm 36 to be extended and retracted with expansion and contraction of bellows 34. In the example of FIGURE 1 arm 36 extends through an aperture (not shown) in bracket 37 in sliding relation and is actually connected to an integrator means, for example a lever arm 31 which is pivotably connected to arm 36 by means of pin 38 as shown.

In accordance with another feature of the example of the present invention, as shown in the figures, fluid filled temperature responsive arrangement, including a bellows 19 connected to temperature transmitting conduit 17 is provided. Bellows 19 is fastened to bracket 21 by means of a flange 23 and bolts 23a and carries an actuator arm 22 which extends through an aperture in bracket 21 (not shown) in sliding relation so arm 22 is extended and retracted in response to change in pressure in bellows 19 resulting from change of temperature of the condensate returned to receiver 7. The free end of rod 22 extends through an aperture (not shown) in a guide bracket 32 which is also fixed to plate 18. Lever arm 31 moves longitudinally with rod 22 but in the arrangement shown in the figures it must also be free to move transversely with respect to rod 22 and is pivotably and slidably connected to rod 22 (as shown) to provide the necessary freedom of movement. The connection shown in the example of the figures includes spaced pins 24, 26 with a spring means 27 disposed between washers 28 on rod 22, as shown so lever arm 31 is retained between the upper washer 28 and pin 24 by the force exerted by spring 27. The arrangement permits lever arm 31 to slidably move longitudinally without binding rod 22 and likewise permits lever arm 31 to be repositioned between pin 24 and washer 28 as necessary in accordance with the relative position of arm 31 and rod 22.

In the example of FIGURE 2 an electrical contacting switch 41, for example a sealed bulb having a small quantity of conductive liquid such as mercury, is carried on the end of lever 31 and since the mercury is free to move in response to the position of the bulb the switch is sensitive to the angular position of the arm. Backing plate 18 carries terminal elements 42, 43 and lead wires 44, 46 which are connected to the terminals and to switch 41. As shown, wires 20 of a power circuit are connected to terminals 43, 42 to provide an electrical circuit to operate motor 9 and vacuum pump 8.

The configuration of the elements of the controller is determined by the application of the switch and in some applications the switch can include relay means (not shown) for reverse action. In the example of the figures switch 41 makes contact to close the circuit and initiate vacuum pump operation as the angular position of the switch is increased relative to the horizontal. It will be noted that in the example of the figures the angle increases in response to increasing pressure in receiver 7 because when bellows 34 expands one end of lever arm 31 is moved downward and in response to decreasing temperature rod 22 and pin 24 move upwardly.

As previously described, the controller in accordance with the present invention initiates operation of motor 8 in response to increasing pressure in receiver 7 at constant condensate temperature and provides for readjustment of the pressure in response to change in temperature of the condensate supplied to receiver 7.

For example, assuming a decrease in pressure in receiver 7 to a predetermined minimum, with no compensating decrease in condensate temperature, bellows 34 contracts so pin 38 moves from point A to point B to change the angular position of the lever, i.e., from position X to position Y shown in dotted lines, so the switch is opened to terminate vacuum pump operation. As hereinbefore described, the elements of the controller are selected to actuate switch 41 so the temperature and pressure in receiver 7 follow the relationship shown by line 10 of FIGURE 3 and particularly that at any condensate temperature operation of pump 8 ceases before the pressure in receiver 7 is decreased to the point where vaporization of the condensate would occur. It will be noted that the sensitivity of the controller is determined by the geometric configuration of switch 41 as it affects the angular disposition of arm 41 between the point where the switch makes contact to close the electrical circuit and the position where the switch breaks contact to open the electrical circuit. After termination of vacuum pump operation air leaking into the system is concentrated in receiver 7 to increase the pressure in the receiver and in response to the increased pressure bellows 34 expands to move pin 38 from point B to point A to change the angular disposition of switch 41, and re-initiate vacuum pump operation.

As hereinbefore stated, the controller in accordance with the present invention, as shown in the example of the drawings, provides means to control the pressure and modify the control range in accordance with the condensate temperature. For example, a decrease in condensate temperature is sensed by thermal element 17 and transmitted to bellows 19 which contracts to move pin 24, and segment of rod 31 contacting pin 24, from position D to position C. This shift of position changes the angular disposition of arm 31 and switch 41 so when the temperature of the condensate decreases, even without a compensating decrease in pressure, switch 41 initiates operation of the vacuum pump to decrease the pressure in receiver 7 to maintain the temperature pressure relationship illustrated by line 10 of FIGURE 3. It will be noted that the decrease in pressure in receiver 7 causes contraction of bellows 34 to urge pin 38 and the end of lever 31 in an upward direction until switch 41 eventually opened to terminate the vacuum pump operation at a new pressure in receiver 7, which is lower than the minimum pressure in the receiver at a higher condensate temperature but is still within the parameters of control established by line 10 of FIGURE 3.

The elements of a controller in accordance with the present invention are selected and assembled to provide a selected relationship between the conditions in the fluid.

Figure 3:
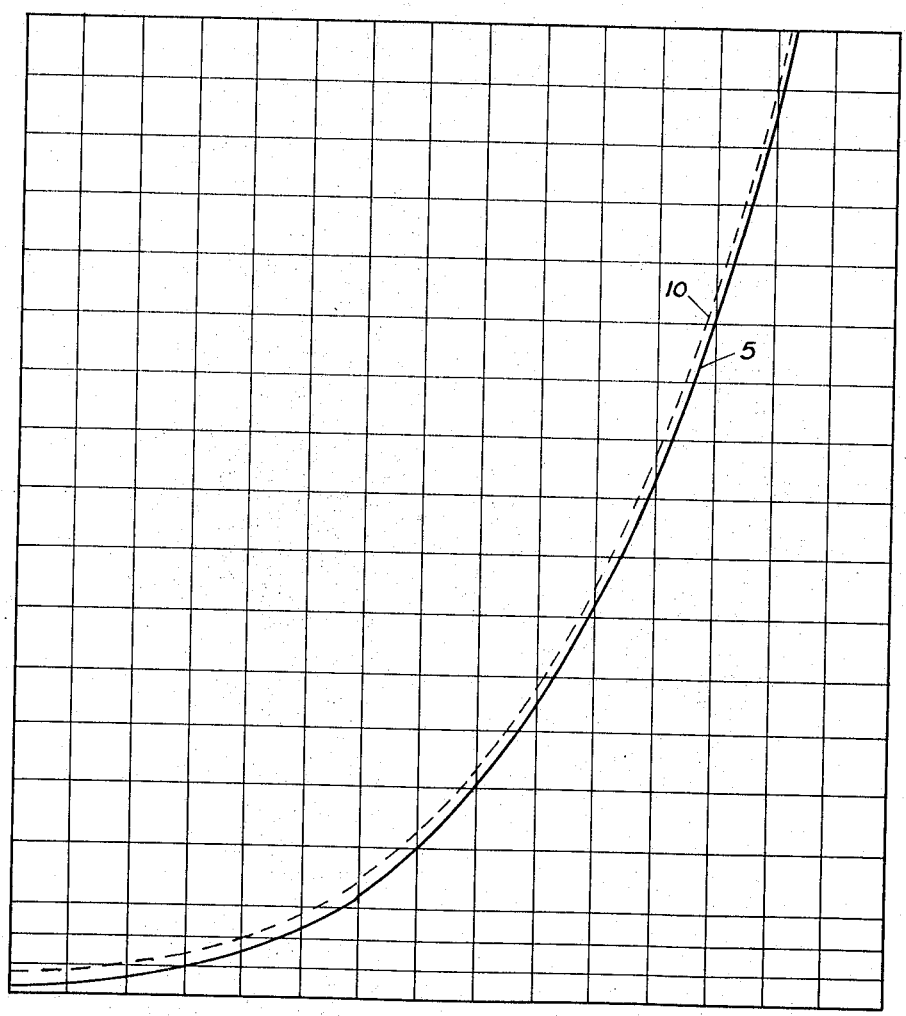

For example, bellows 19, 34, arm 31, rods 36, 22 and lever arm 38 of the controller as shown in the example are selected to provide a continuous pressure-temperature relationship in receiver 7 as shown by line 10 of FIGURE 3. It will be noted that by proper selection of the elements, the pressure-temperature relationship can be selectively controlled to prevent undesirable vaporization (or liquification) of any fluid.

Furthermore, it is to be understood that while the invention was hereinbefore described in relation to a heating system, controllers in accordance with the invention will undoubtedly find application in other environments and the applications and use of the switch is not in any way to be limited by the preceding description.

The invention claimed is:

1. A controller to control the relationship between selected conditions of a fluid comprising: first condition responsive means operable in response to change in a first condition of said fluid; first actuator means connected to said first condition responsive means and moved along a generally linear path by said first condition responsive means in response to change in said first condition of said fluid; second condition responsive means operable in response to change in a second condition of said fluid; second actuator means connected to said second condition responsive means and moved along a generally linear path in response to movement of said second condition responsive means in response to change in said second condition of said fluid; integrator arm means connected only to said first and second actuator means wherein said arm means are retained at the same angular orientation, relative to direction of movement of said first and second actuator means, in response to simultaneous equidistant movement of said first and second actuator means in the same relative direction along said linear paths at the same rate of movement, and wherein the angular orientation of said actuator means, relative to direction of movement of said first and second actuator means, is varied with independent relative movement of said first and second actuator means along their respective paths; switch means carried by said lever means and operable in response to the angular position of said lever arm; and, means operable by said switch means to selectively modify the relationship between said first and second conditions.

2. The apparatus of claim 1 wherein said first condition responsive means includes pressure responsive bellows means communicating with said fluid to move said first actuator means in response to a change in fluid pressure and said second condition responsive means includes temperature responsive bellows means communicating with said fluid to move said second actuator means in response to change in fluid temperature wherein said switch means operates fluid pressure control means operable to maintain said fluid in a selected thermodynamic condition.

3. A steam heating system comprising a boiler to vaporize a heating fluid; heat exchange means to condense said fluid; a receiver to receive condensed fluid, and a vacuum means to maintain a selected pressure in said receiver, an improved controller to maintain fluid in said receiver in a liquid state comprising: a pressure responsive bellows means communicating with said receiver; first actuator means connected to said bellows means to be moved in response to expansion and contraction of said first bellows means; tempearture responsive bellows means communicating with fluid in said receiver means; second actuator means connected to said temperature responsive bellows means to be moved in response to expansion and contraction of said second bellows means in response to change in temperature of said condensate; lever arm means pivotably connected to the first and second actuator means; switch means carried by said lever arm means and operable in response to the angular position of said lever arm; pressure modifying means operable by said switch means to modify the pressure-temperature relationship in said receiver to maintain said condensate in a liquid state.

4. The controller of claim 1 wherein said first condition responsive means is operable in response to change in temperature of said fluid and wherein said second condition responsive means is responsive to change in pressure of said fluid and said switch means carried by said lever means operates pressure control means to selectively modify the relationship between temperature and pressure in said fluid to maintain said fluid in a selected thermodynamic state.

References Cited

UNITED STATES PATENTS

| | | | |
|---|---|---|---|
| 1,975,851 | 10/1934 | Kimball | 236—91 X |
| 2,474,369 | 6/1949 | Ray | 236—91 X |
| 2,586,972 | 2/1952 | McKenzie | 236—92 X |
| 2,849,577 | 8/1958 | Pfeiffer. | |
| 3,129,309 | 4/1964 | McKeough. | |
| 2,371,428 | 3/1945 | De Giers et al. | 236—86 |

EDWARD J. MICHAEL, Primary Examiner

U.S. Cl. X.R.

337—308